United States Patent [19]

Yu et al.

[11] Patent Number: 4,711,341

[45] Date of Patent: Dec. 8, 1987

[54] PACKAGE SORTATION CONVEYOR

[75] Inventors: Thomas C. Yu; Robert K. Vogt; John J. Wilkins, all of Cincinnati, Ohio

[73] Assignee: The E. W. Buschman Company, Cincinnati, Ohio

[21] Appl. No.: 878,734

[22] Filed: Jun. 26, 1986

Related U.S. Application Data

[63] Continuation of Ser. No. 675,156, Nov. 27, 1984, abandoned.

[51] Int. Cl.$^4$ .............................................. B65G 47/46
[52] U.S. Cl. ................................... 198/372; 198/440; 198/482.1
[58] Field of Search ............... 198/365, 366, 370, 372, 198/456, 457, 440, 734, 482.1; 104/103, 130

[56] References Cited

U.S. PATENT DOCUMENTS

| | | | |
|---|---|---|---|
| 3,361,247 | 1/1968 | Lauzon et al. | 198/370 X |
| 3,677,389 | 7/1972 | Benatar et al. | 198/440 X |
| 4,138,008 | 2/1979 | Del Rosso | 198/365 |

FOREIGN PATENT DOCUMENTS 2745298  11/1978  Fed. Rep. of Germany ... 198/482.1

Primary Examiner—Robert J. Spar
Assistant Examiner—Jonathan D. Holmes
Attorney, Agent, or Firm—Biebel, French & Nauman

[57] ABSTRACT

In a package sortation conveyor comprising an endless apron supported for movement on a frame defining a main line and one or more side outlets therefrom, and a plurality of pusher elements mounted for sliding movement on the apron from one side thereof to the other to push a package through one of the side outlets, each pusher element has a guide pin depending therefrom and an anti-friction bearing on the upper part of the guide pin for cooperation with a switching mechanism and a camming bar in such manner that when a pusher element is diverted from its rest position at one side of the apron, the bearing thereon will engage the camming bar during the balance of its travel across the apron. In addition, special guide members are provided for preventing any incompletely diverted pusher element from jamming against a stationary part of the conveyor and for preventing any pusher element from jamming against a package which has been held against forward movement on the apron.

7 Claims, 15 Drawing Figures

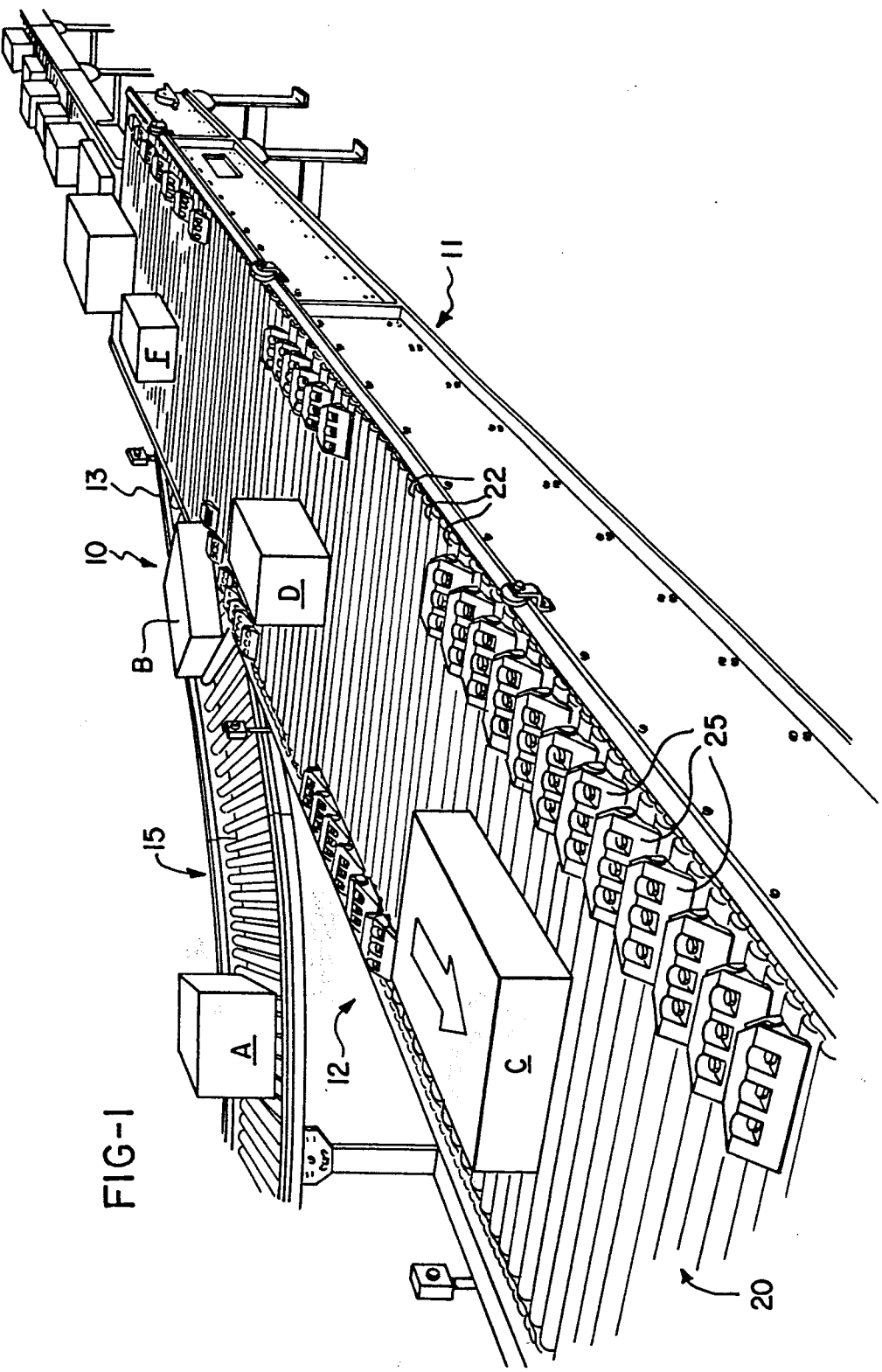

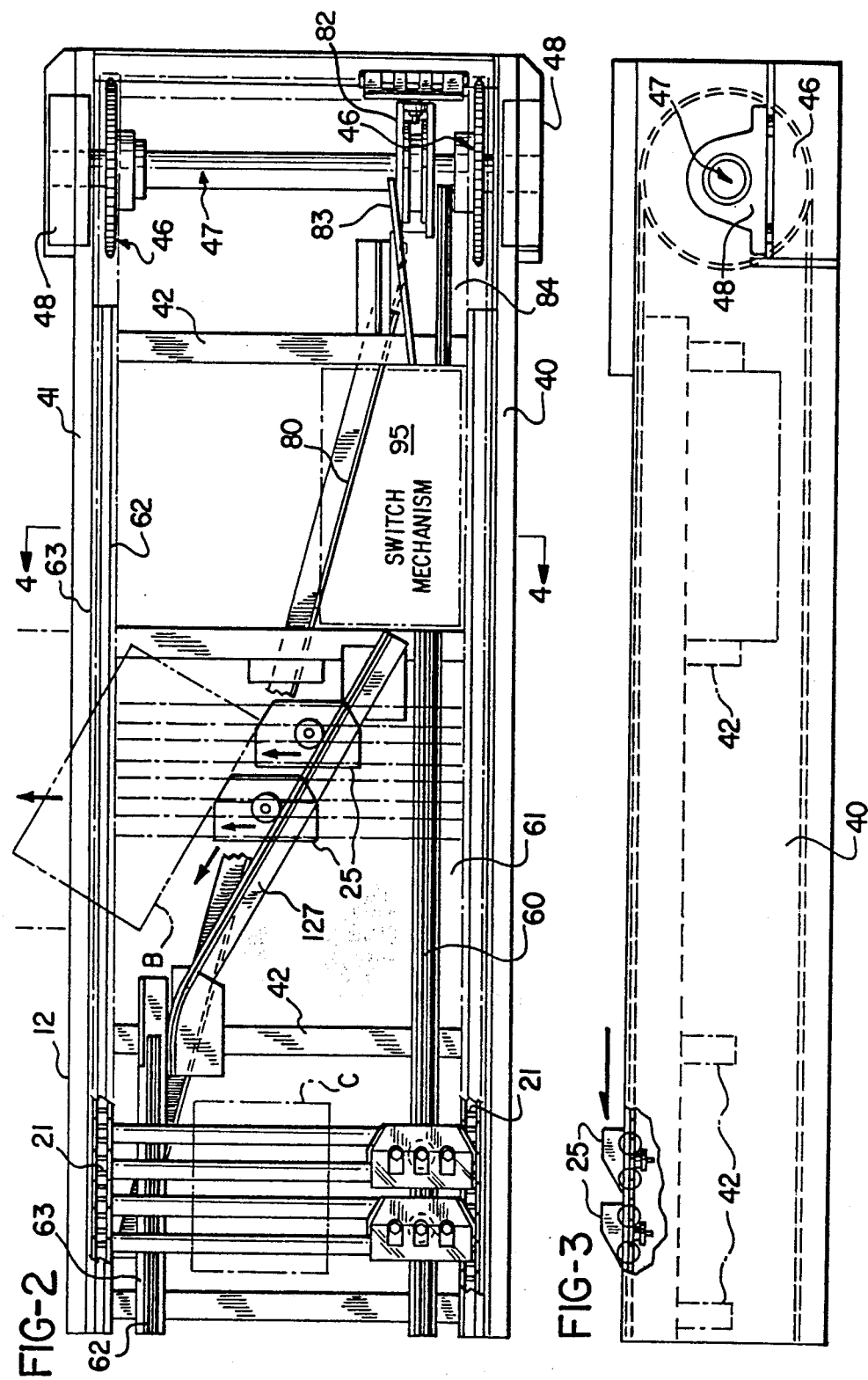

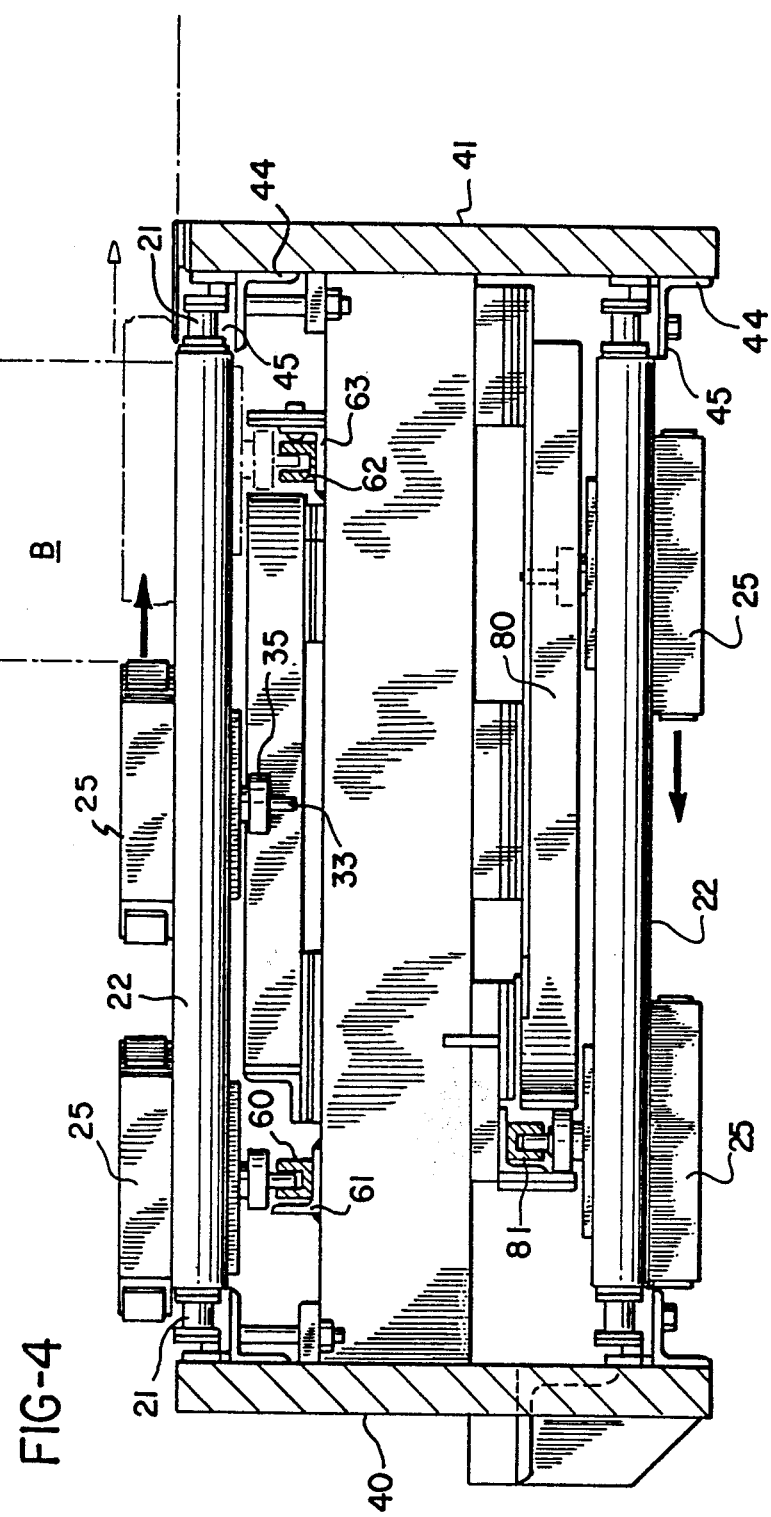

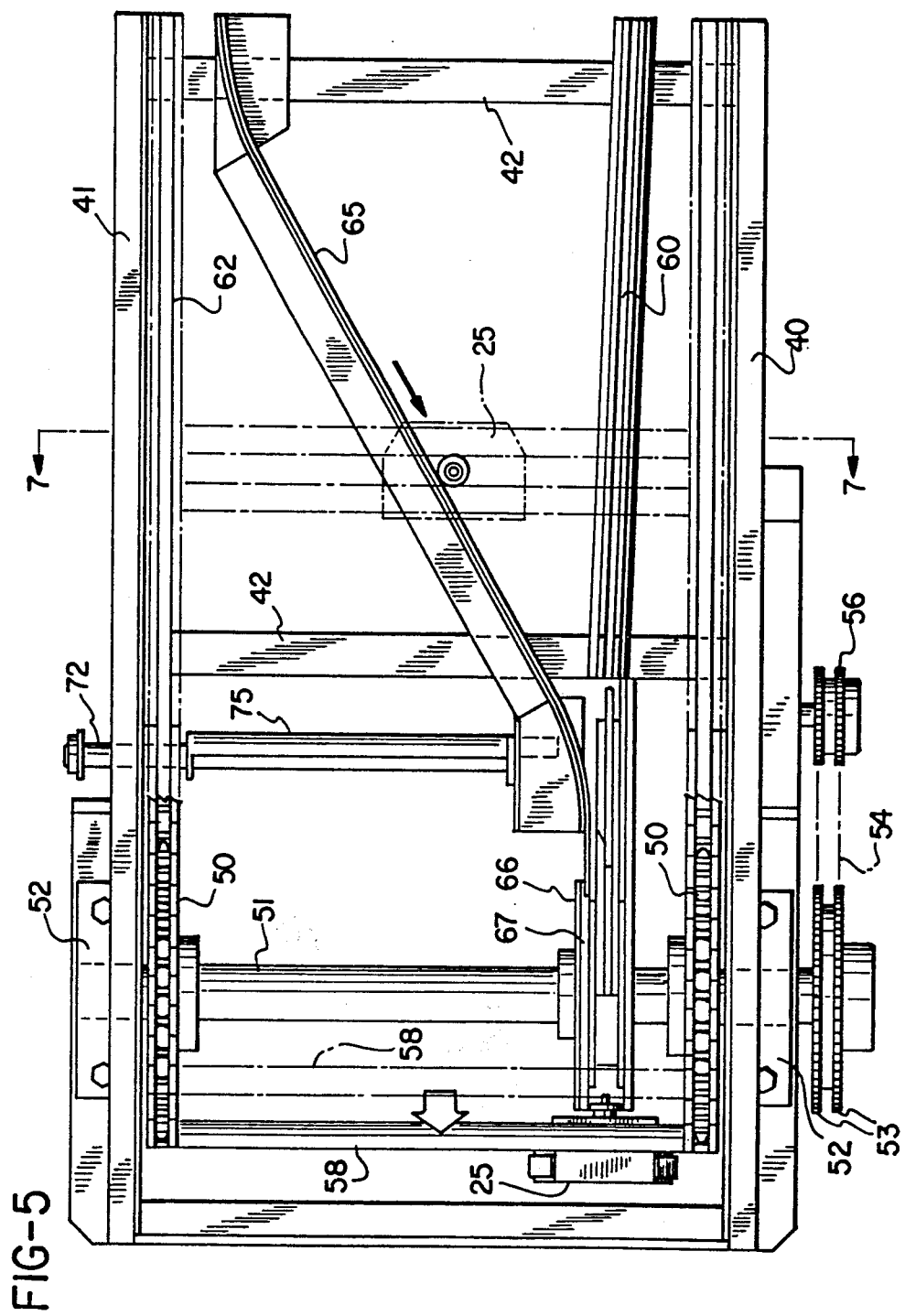

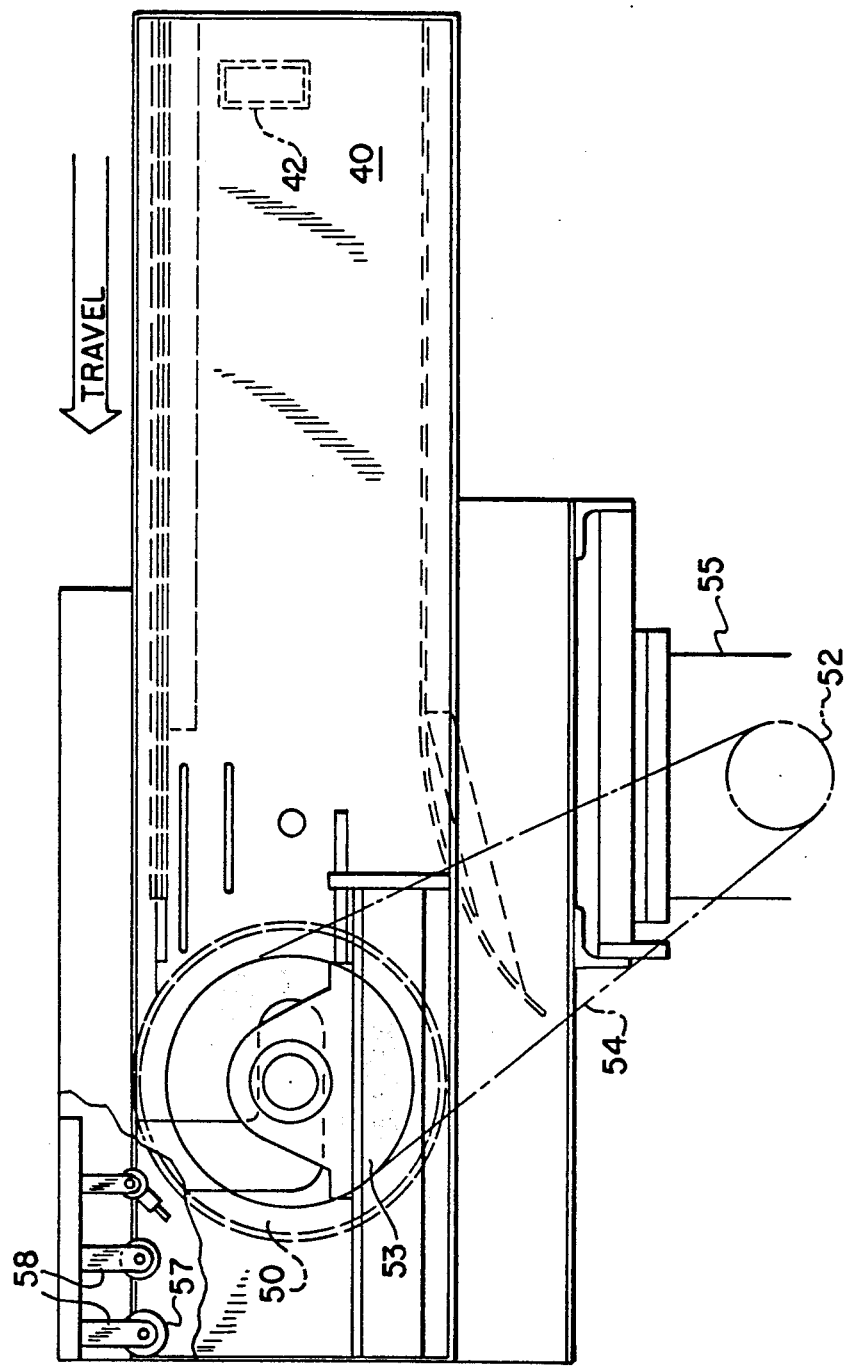

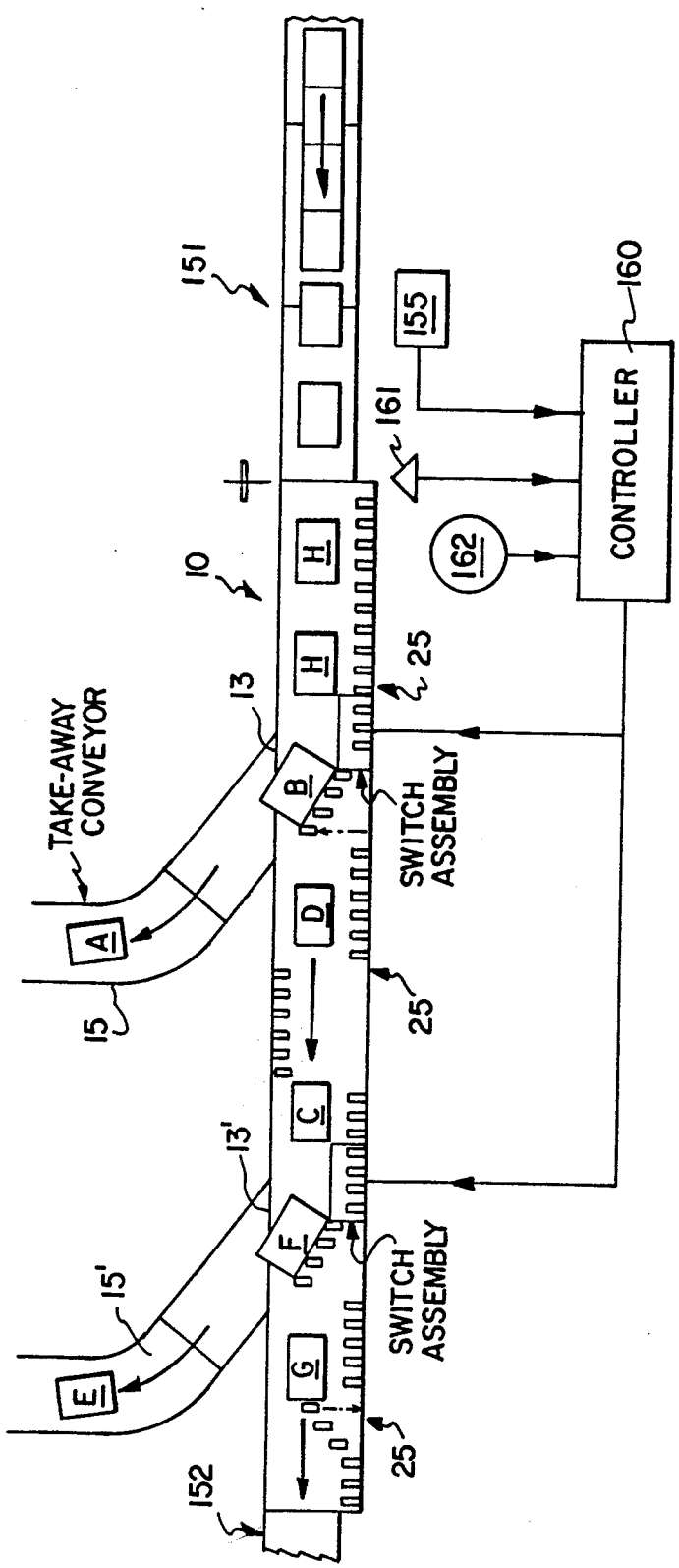

PACKAGE SORTATION CONVEYOR

REFERENCE TO COPENDING APPLICATION

This application is a continuation of application Ser. No. 675,156, Nov. 27, 1984 and now abandoned.

BACKGROUND OF THE INVENTION

This invention relates to package conveyors, and more particularly to apron-type sortation conveyors provided with one or more branch lines to which selected packages can be diverted out of the main line.

The invention is particularly concerned with such conveyors wherein the diverting action is effected by means of a series of pusher elements which travel with the conveyor and are normally retained along one side of the conveyor but are caused to move across the apron at the appropriate time to push a selected carton or other package into a branch outlet. More specifically, reference is made to Greller et al U.S. Pat. No. 2,868,394 of 1959, which is believed to be a pioneer patent insofar as this particular type of sortation conveyor is concerned.

SUMMARY OF THE INVENTION

The sortation conveyor of the present invention incorporates principles of the above Greller patent, in that it includes a frame defining the main line of the conveyor and at least one branch outlet therefrom, an endless apron supported for movement on the frame to define the top conveying run and a bottom return run, a plurality of pusher elements mounted for movement with the apron and also for sliding movement across the apron from one side thereof to the other, and selectively operable means for causing a desired number of pusher elements to move across the apron as they move forward with it and thereby to push a selected package from the apron into a branch outlet therefrom. The invention provides improvements over the sortation conveyor shown in the Greller patent in a number of respects, as summarized below.

More specifically, each of the pusher elements is equipped with a guide pin which depends therefrom and carries an anti-friction bearing at the upper end thereof. When the pusher elements are in their normal rest positions along one side of the conveyor apron, each of these pins will pass in succession through a channeled switch member pivoted to swing between a retracted position parallel with the course of the apron and an advanced position at an acute angle to the apron course.

When a package is to be diverted from the apron to a branch outlet, this switch is shifted to its advanced position wherein it diverts successive pusher elements away from the side of the apron. As soon as the pin on each such diverted pusher element leaves the switch member, the anti-friction bearing thereof is caused to engage a guide member which extends across the frame at an angle to the apron course. The forward movement of the pusher element with the apron will also cause it to be cammed laterally across the apron and thereby to cooperate with adjacent pusher elements to push the selected package through the branch outlet, and during this working movement, the lateral thrust force will be transmitted to each pusher element through its anti-friction bearing to minimize wear on the pin and guide member as well as the load on the conveyor motor.

The invention also provides special measures for assuring proper operation of the switching mechanism for the pusher members and also for minimizing the possibility of damage to any package which may be impeded in its proper movement with the conveyor apron. Thus in the event that the switching movement of the switching member is incomplete or retarded, special guide members are provided for intercepting and returning an incompletely switched pusher member back to its normally neutral position along the edge of the conveyor without the possibility of jamming on any stationary part of the conveyor.

Further, the pusher members of the invention are specially constructed for use on an apron composed of multiple spaced tubes so that the leading edge of each pusher member in the direction of travel of the apron lies below the level defined by the tops of the tubes. As a result, if a package should be impeded against movement with the apron, as for example by striking the downstream edge of a branch outlet, each successive pusher element which encounters such impeded package will pass underneath it, lifting the package up sufficiently to do so, but without causing any damage to the package.

BRIEF DESCRIPTION OF THE DRAWINGS

FIG. 1 is a fragmentary isometric view illustrating a sortation conveyor section in accordance with the invention;

FIG. 2 is a top view of the upstream, or entry end of the conveyor section of FIG. 1;

FIG. 3 is a side view of the portion of the conveyor shown in FIG. 2;

FIG. 4 is a vertical section on the line 4—4 of FIG. 2;

FIG. 5 is a plan view of the discharge end of the conveyor section of FIG. 1;

FIG. 6 is a side view of the portion of the conveyor shown in FIG. 5;

FIG. 15 is a schematic plan view illustrating the operation of the conveyor section of FIG. 1 and the essentials of a wiring diagram therefor.

DESCRIPTION OF THE PREFERRED EMBODIMENT

Figure 7:
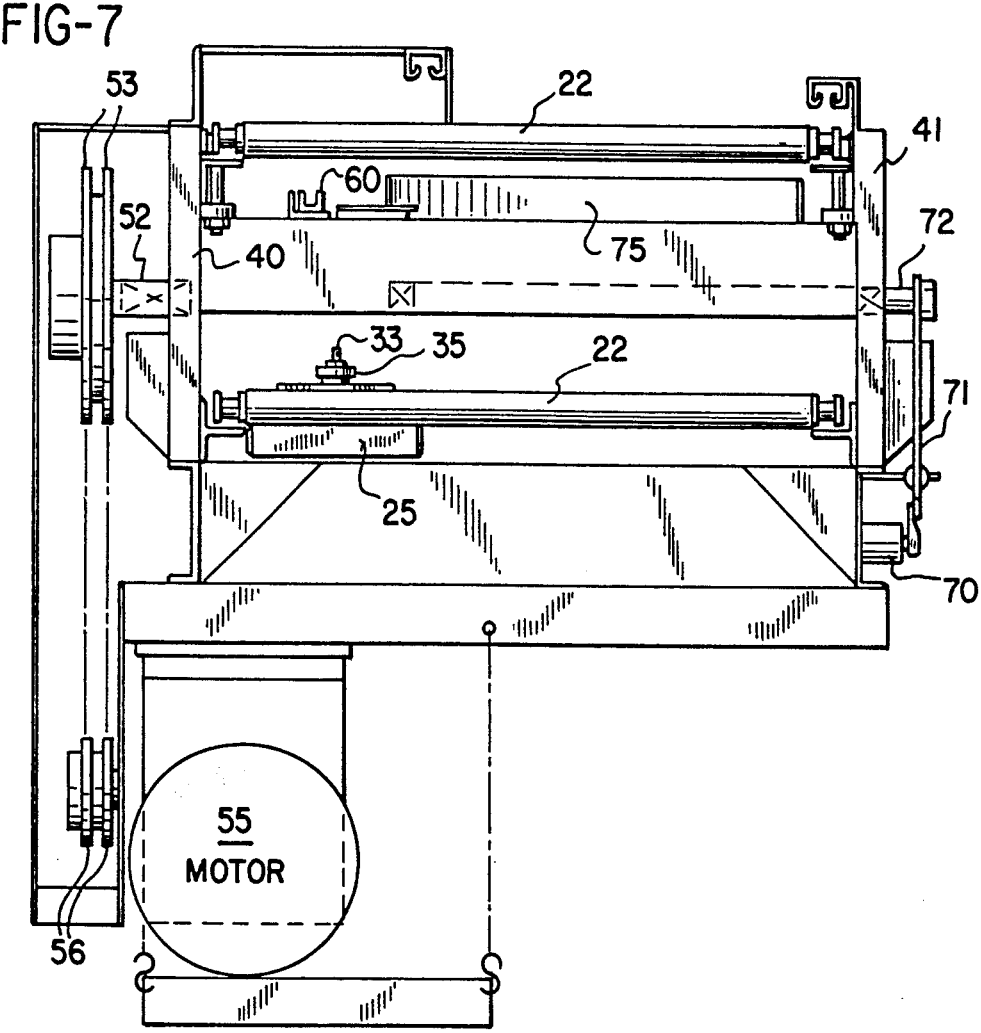
FIG. 7 is a vertical section on the line 7—7 of FIG. 5.

The isometric view in FIG. 1 shows a portion of a package conveyor system including a sortation section 10 in accordance with the invention comprising a frame generally designated as 11 which defines the main conveying line 12 and has a branch outlet 13 connecting with a branch line 15. An endless apron 20 is supported for driven movement on the frame 11 to define a top conveying run moving from right to left, and a bottom return run, the apron 20 being composed of a pair of roller chains 21 and multiple parallel cross tubes 22 carried by the chains. It will be understood that any number of branch outlets and lines can be used as desired.

A pusher element 25 is mounted for sliding movement on each pair of cross tubes 22, and in the operation of the conveyor section shown in FIG. 1, these pusher elements are normally retained along the left-hand side of the apron 20 as viewed in its direction of travel. When a package traveling on the apron approaches a position opposite a branch outlet 13 through which it is to be diverted,, the pushers 25 traveling on the apron beside that package are actuated to move across the apron in such timed relation that they push the package through the branch outlet 13 onto the branch conveyor line 15.

Thus in FIGS. 1 and 15, package A has already been diverted to the branch conveyor 15 by the pusher elements 25 which appear just behind and to the right of package B, which has similarly just been diverted to the branch line by the pusher elements which have moved to the right of the conveyor. Packages C and D have moved past the branch outlet, and package F has not yet reached the point at which the pusher elements aligned with it would begin to move if it is to be diverted to the branch line.

Figure 8:
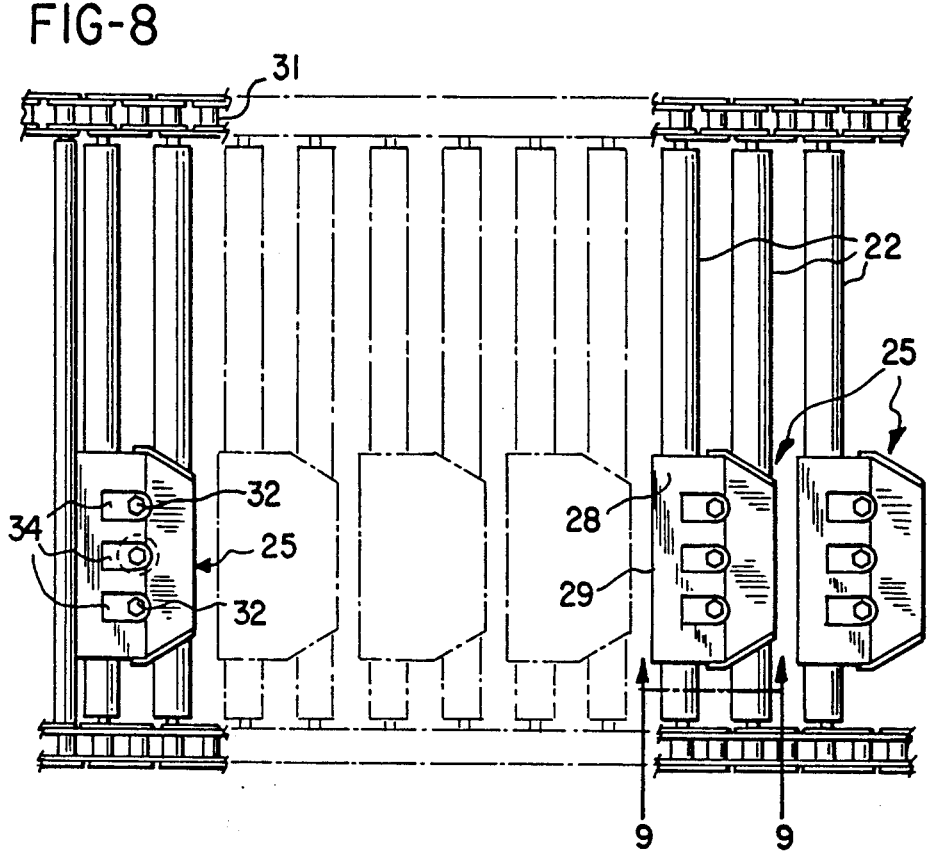
FIG. 8 is a fragmentary view showing in enlarged detail one of the pusher elements of the invention on a fragment of the conveyor apron.
Figure 9:
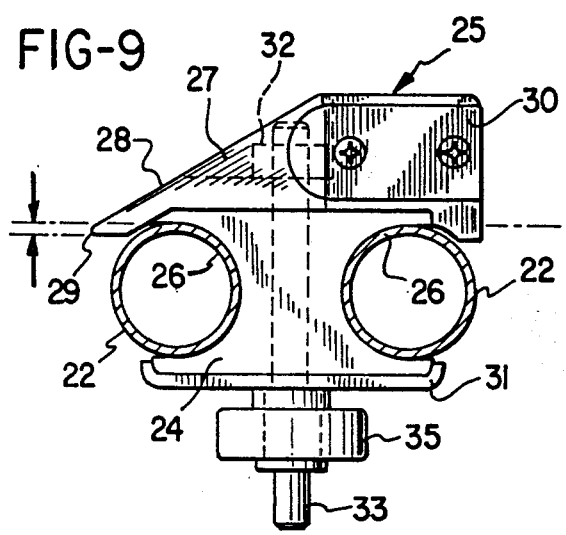
FIG. 9 is a vertical section on the line 9—9 of FIG. 8.

One of the pusher elements 25 is shown in detail in FIGS. 8 and 9. It comprises a base 24 which is generally I-shaped in cross section with its opposite sides rounded to provide a pair of semi-cylindrical recesses 26 which form slideways proportioned to be received between and slide on a pair of adjacent cross tubes 22, and the base 24 is therefore preferably formed of a plastic material having good anti-friction properties, such as polyethylene. For example, if the tubes 22 are formed of steel with an outer diameter of 1.375 inches, the base 24 may be of molded UHMW polyethylene with each recess 26 approximately 0.700 in radius to provide essentially line contact between the inner surfaces of the recesses 26 and the tubes 22.

As shown in FIG. 9, the cap 27 of the pusher element, which may be formed of similar plastic material, has a leading face 28 proportioned to overhang the forward one of the two tubes 22 on which it is mounted so that its leading edge 29 lies well below the plane defined by the tops of the slideways 26, as shown by the dimension arrows in FIG. 9, and therefore similarly below the plane defined by the tops of the tubes 22, and the face 28 is inclined rearwardly and upwardly at a substantial angle to the vertical, e.g. 60°. With this arrangement, if a pusher element should encounter a package which has for some reason been blocked from further progress on the apron 20, the leading face 28 of the pusher element would simply lift the package sufficiently so that the entire pusher element could pass under the package with no damage thereto or to any part of the conveyor.

The rearward two corners of the cap 27 are beveled because, as should be apparent from FIGS. 1 and 15, when a pusher element is in operation, its action is to skew a package on tne conveyor apron, and its beveled corner will then make face to face contact with the package. These corners are therefore also recessed to receive complementarily shaped bumpers 30 of a suitably high friction plastic material such as urethane. A stiffener plate 31 of metal underlies the pusher element base 24 and is secured thereto and to the cap 27 by nuts 32 on two bolts and the threaded upper end of a guide pin 33 mounted in centered position in each pusher element with its lower end depending below the plate 31, the nuts 32 being seated in recesses 34 in the upper surface of the cap 27. The guide pin 33 carries an anti-friction bearing 35 positioned immediately below the plate 31 so that a portion of the pin 33 extends before bearing 35.

Referring now to FIGS. 2-4, the frame 11 comprises opposed side plates 40 and 41 and cross braces 42 at spaced locations along the length of the frame. Angles 44 bolted on the inside of the frame plates 40 and 41 support the guides 45 for the conveyor chains 21, which at the upstream end of the section run over a pair of sprockets 46 on a idler shaft 47 mounted in bearings 48.

Referring to FIGS. 3-6, the drive for the conveyor chains is mounted at the downstream end of the sortation section, and comprises sprockets 50 on a shaft 51 mounted in bearings 52 and carrying sprockets 53 at one end which are driven through chains 54 by a motor 55 suspended below the bottom of the frame 11 and having sprocket 56 on its drive shaft. Since the tubes 22 follow the chains 21 around the sprockets 50, idler rollers 57 are mounted by means of brackets 58 at the discharge end of the section to deliver packages to the next section of the conveyor system.

As previously noted, each of the pusher elements 25 is normally retained along the left hand side of the apron 20, by means of a channel shaped guide 60 which is proportioned to receive the end of each successive guide pin 33 slidably therein, the guides 60 being mounted on angles 61 supported on the frame braces 42. A similar pin guide channel 62 is mounted by means of an angle 63 along the right hand side of the frame.

Since it is necessary that all pusher elements start their run down the main conveying line along the left hand side of the apron, provision is made for transferring any which are on the right hand side of the apron at the downstream end of the top run of the apron. Referring to FIG. 5, an elongated angle 65 is mounted on a pair of frame braces 42 and is provided with oppositely curved ends so arranged that as the guide pin 33 on each successive pusher element 25 leaves the downstream end of the pin guide 62, its associated bearing 35 will engage the inner surface of the angle 65 and be guided thereby across the apron to the downstream end of angle 65.

At this point, the guide pin 33 thereon will enter a short length of channeled pin guide 66 from which it is delivered to a channeled wheel 67 on the conveyor drive shaft 51. This wheel 67 is proportioned to receive both the guide pin 33 and bearing 35 between its two sides to guide the successive pusher elements 25 around to the return run of the apron 20. Note that the pin guide 66 is aligned with the left hand pin guide 60 so that it will also receive the guide pins 33 on successive pusher elements which have remained along the left hand side of the apron.

As a safety measure in the event that any pusher assembly should miss or jump over the return angle 65, a limit switch 70 (FIG. 7), which will shut off the motor 55, is mounted on the frame side 41 in position for actuation by an arm 71 depending from a rock shaft 72 journaled in the frame. A plate 75 is secured to the shaft 72 and extends upwardly therefrom into the path of the guide pin 33 on any pusher element 25 which passes the angle 65. Movement of the plate 75 forward by any such guide pin will actuate the limit switch 70 to shut off the motor 55.

Provision is also made for assuring that all pusher elements will be properly aligned along the left hand end of the apron at the upstream end of the sortation section 10. Referring to FIG. 2, an elongated inverted angle 80 is mounted on the frame 11 between the top and bottom runs of the apron 20 in position to intercept the bearing 35 carried by any pusher element 25 which is not already on the same side of the conveyor as the pin guide 60. At the right hand end of this angle 80 as viewed in FIG. 2, it guides any bearing 35 in engagement therewith so that its associated guide pin 33 enters a short length of inverted pin guide channel 81 (FIG. 4) which leads directly into a channeled pin guide wheel 82 like the pin guide wheel 67 and mounted on the same shaft 47 as the chain drive sprockets 46.

At the top of the upstream end of the conveyor in FIG. 2, a bar or angle 83 is mounted at an angle to the direction of apron travel and cooperates with a bar or angle 84 to guide the bearing 35 on each successive pusher element 25 so that its associated guide pin 33 enters a short length of pin guide channel 85 which is aligned with the pin guide channel 60. The pin guide 85 has the major part of the bottom of its channel portion cut out to provide a space 88 below which is located a proximity switch 90 that senses the passage of each successive guide pin 33 through guide 85 as a part of the control circuit for the assembly by which selected pusher elements 25 are diverted from passage along the left hand side of the conveyor to push selected packages through the branch outlet 13 as now described.

Figure 10:
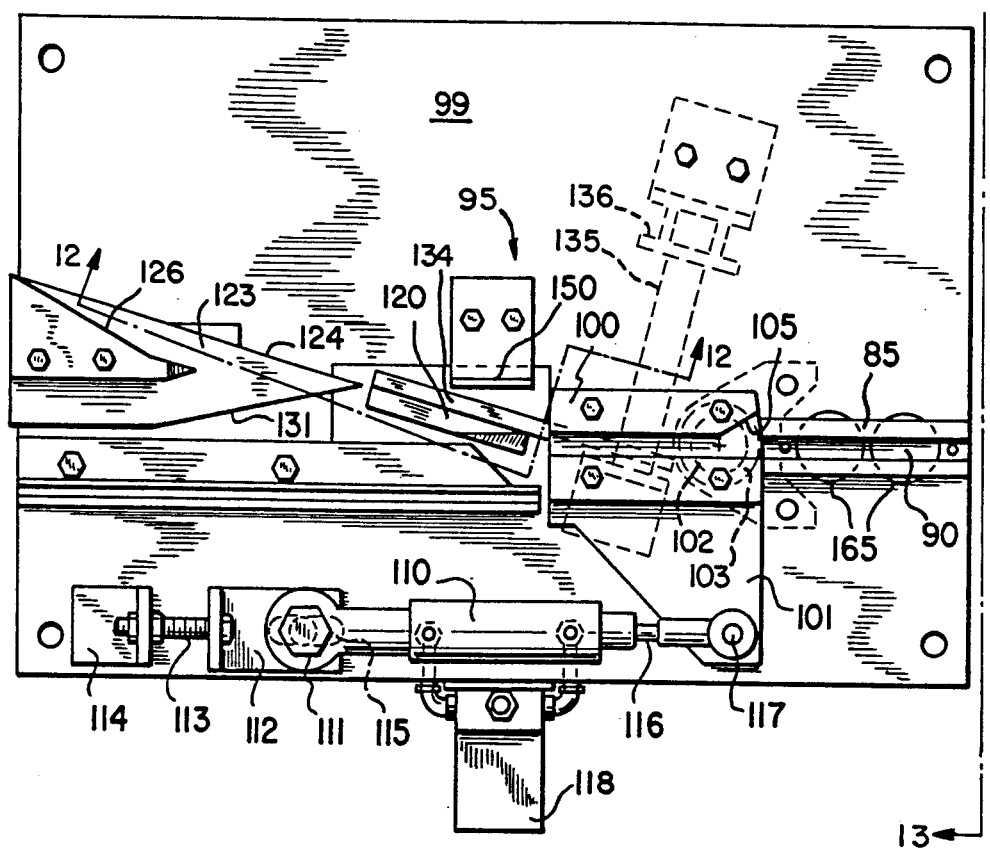
FIG. 10 is a plan view of the portion of the conveyor which includes the switching assembly for causing selected pusher elements to travel across the conveyor.
Figure 11:
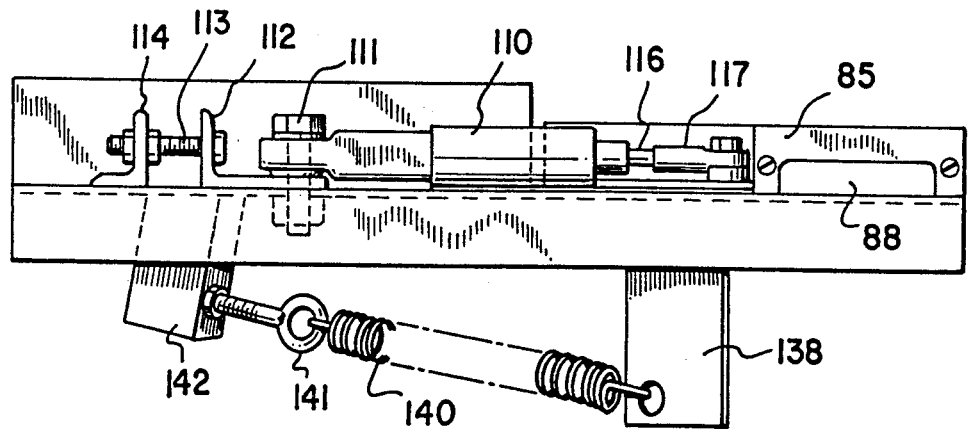
FIG. 11 is a side view of the switching assembly of FIG. 10.

Referring to FIGS. 10–14, the switch mechanism 95 as a whole is carried on a mounting plate 99 mounted on the frame below the top run of the apron 20. The switch member 100 is a short length of channeled pin guide material like the pin guides 60 and 62, and it is bolted to a plate 101 having a shaft 102 secured thereto and mounted for pivotal movement in a bearing 103 mounted on the bottom of plate 99. As shown in FIG. 10, one side of the channel portion of the switch member 100 is cut away on an angle at 105 to widen the entry to the channel for a reason which will become apparent as the description proceeds.

The switch member 100 is pivotally movable between a retracted position (FIG. 10) wherein the channel therein forms a continuation of the channels in the pin guides 60 and 85, and an advanced position (FIG. 14) at an acute angle to the pin guides 60 and 85 wherein it diverts successive pusher element guide pins away from the pin guide 60. This movement is effected by a double-acting fluid pressure cylinder 110 which has its mounting end pivotally secured to the mounting plate 99 by a bolt 111 mounted in an angle bracket 112 connected by an adjusting bolt 113 to an angle bracket 114 welded to the plate 99. The bolt 111 passes through a slot 115 in the plate 99 to provide for the desired adjusting movement of the pivot bolt 113 of cylinder 110.

The piston rod 116 of the cylinder 110 is pivotally connected by a bolt 117 to the pivoted plate 101 so that movement of the piston rod in and out of its cylinder 110 will cause the desired pivoting movement of the plate 101 about the axis of its pivot shaft 102. A solenoid valve 118 is mounted to the side of switch mounting plate 99 and controls the flow of pressure fluid to and from the cylinder 110.

Figure 14:
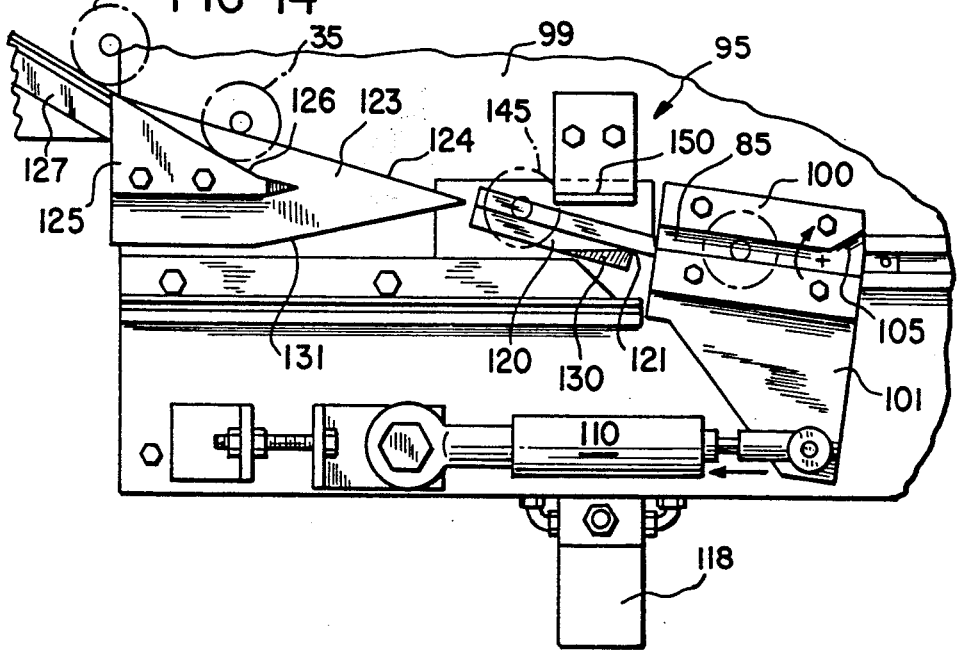
FIG. 14 is a fragment of FIG. 10 showing the switch member moved to its diverting position.

When switch member 100 is in its advanced position shown in FIG. 14, the channel therein is at a angle of approximately 15 degrees to the channel in pin guide 85, but the bevel 105 will keep its inlet end open to receive successive guide pins 33 from the channel in pin guide 85. Each successive guide pin 33 is therefore diverted to the right as it enters member 100 and thereby caused to move its associated pusher element 25 across the apron until it leaves the switch member 100.

At this point, assuming that the switch member 100 is in its fully advanced position, the diverted guide pin will then engage the right hand side of a blade 120 having a knife edge 121. Tnis blade will continue the guiding of the guide pin 33 across the apron until the guide pin reaches a generally triangular guide plate 123 rigidly mounted on plate 99 and having its right hand edge 124 substantially aligned with the right hand side of the blade 120 to continue urging each guide pin to the right.

A second fixed guide plate 125 is bolted on top of guide plate 123, and it has an arcuately curved guiding edge 126 set back from the guiding edge 124 of plate 123 for engagement with the bearing 35 on each diverted guide pin. As shown in FIG. 14, the downstream end of the surface 126 crosses the edge 124 of plate 123 and meets the upstream end of the right-hand side of an angle 127 extending diagonally across the frame 11. Thus as the diverted pusher element continues to move forward with the apron 20, engagement of its bearing 35 with the curved surface 126 first causes its pin 33 to be pushed free of plate edge 124. The bearing 35 will then continue to travel along the angle 127 and will thereby cause the pusher element to continue to move to the right until its guide pin 33 enters the pin guide 62, with the side thrust being transmitted to the pusher element through its bearing rolling on the angle 127 rather than through its pin.

Figure 12:
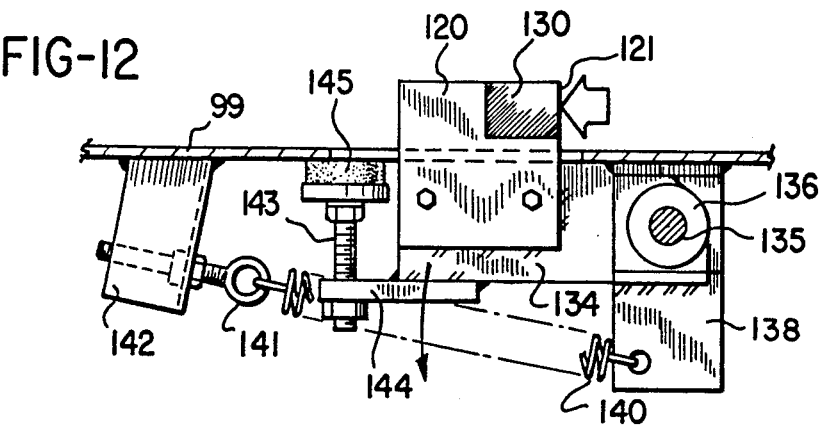
FIG. 12 is a partial vertical section on the line 12—12 of FIG. 10 with parts removed for better clarity.
Figure 13:
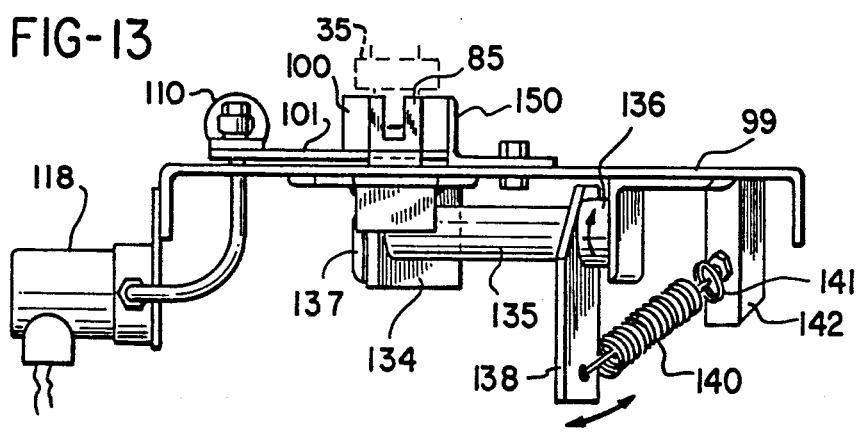
FIG. 13 is a side view looking as indicated by the line 13—13 of FIG. 10.

Special provision is made to prevent a pusher element from becoming jammed on any stationary part of the conveyor mechanism in the event of failure of the switch member 100 to complete movement to its advanced position. Referring to FIGS. 12–14, the blade 120 has initial responsibility for determining whether the guide pin 33 on each successive pusher element has been properly diverted for movement across the apron 20. Thus if a guide pin is clearly to the left of the knife edge 121 on blade 120 when it leaves the switch member 100, it will be restrained against further movement across the apron by one or more of the bevelled surface 130 on blade 120, the remaining left hand surface of blade 120, and the guiding edge 131 on the guide plate 123, which will also guide it to the upstream end of the pin guide 60 along the left hand side of the apron.

If a guide pin 33 should be in such a position that upon leaving the switch member 100, it strikes the knife edge 121 relatively directly, the blade 120 will drop away out of its path. For this purpose, the blade 120 is supported by an arm 134 welded to project radially from a rock shaft 135 supported at one end in a bearing and bracket assembly 136 mounted on the underside of the plate 99, the other end of the shaft 135 being supported in a bearing and bracket assembly 137 also mounted on the underside of plate 99.

Another arm 138 is welded to shaft 135 to depend therefrom at approximately 90° to the arm 134. The lower end of the arm 138 is connected by a tension spring 140 to an eye bolt 141 mounted in a bracket 142 welded to the underside of plate 99. Thus the spring 140 normally biases the shaft 135 to raise the arm 134 and blade 120 to a horizontal limit position established by a screw 143 carried by a bar 144 welded to the arm 134 and having a rubber bumper 145 at its upper end for engagement with the underside of the plate 99.

With this arrangement, the blade 120 is normally biased by the spring 140 to the position shown in FIG. 12, but whenever its knife edge 121 is struck nearly head on by a guide pin 33, it will be forced to drop out of the way by pivoting downwardly with the shaft 135. Whenever this action occurs, however, the pin 33 which strikes the blade is likely to be deflected away from its desired course in alignment with the edge 124 of plate 123, and it is important that any such pin be prevented from jamming any other part of the conveyor.

If such a deflected pin should be moved to the left, then as it continues to move forward with the apron, it will encounter the edge 131 of plate 123 and be guided thereby back to the pin guide 60. Movement of such a deflected pusher member toward the left of the apron will be limited by engagement of the bearing 35 thereon with the bar 148 until the associated pin 33 enters the guide 60.

If, however, a pin 33 should be deflected to the right, it will encounter the upwardly extending flange of an angle bracket 150 bolted on top of plate 99, which is so aligned with the knife edge of plate 123 that it will guide the pin into engagement with the edge 131 of plate 123 and thus back to the pin guide 60. In either case, the pin will be prevented from reaching any position in which it could jam the conveyor by engagement with a fixed part, and operation of the conveyor will continue.

The schematic diagram in FIG. 15 illustrates the operation of a package conveyor system wherein a sortation section 10 is connected between an induction section 151 and another straight section 152, the sortation section 10 being shown as having two branch outlets 13 and 13' each connecting with a branch line 15 and 15' respectively.

As in FIG. 1, package A has already been diverted to the branch conveyor 15 by the pusher elements 25 which are along the righthand side of the conveyor between packages C and D. Package B is in the process of being diverted to the branch line 15 by the pusher elements which are in the process of moving to the right of the conveyor, and packages C and D have moved past the branch outlet 13 but not yet reached the point at which the pusher elements aligned therewith would begin to move if either is to be diverted to the branch line 15'.

Package E has already been diverted to the branch line 15', and the pusher elements which diverted it are on their way back to the other side of the conveyor ahead of package G. Package F is in the process of being diverted through the branch outlet 13', and package G has moved past both branch outlets for continued travel along the main line. The packages H at the upstream end of the sortation section and the other packages behind it on the induction section 155 are still progressing toward the point at which diverting thereof will begin if required as now described.

The block 155 in FIG. 15 represents a scanner for reading information on the successive packages to determine whether or not each is to be diverted by the sortation section 10. For example, the scanner 155 may be an individual who reads codes on the successive packages and records them on a keyboard, or it may be any form of optical or magnetic scanner conventionally used for this purpose on sortation conveyors. Whatever the nature of scanner used, for each given package to be diverted, the scanner station 155 will transmit a suitable signal to the controller station 160, which may be any conventional computer of the necessary capabilities in accordance with the skill of the art.

A sensor 161, such as an electric eye, is set at a predetermined point at the upstream end of the sortation section 10 to note the entry of each successive package to the section 10 and to give a signal to that effect to the controller 160. If the scanner 155 has signaled that the particular package is to be diverted, as in the case of packages A and B, then the controller 160 responds to the signal from the electric eye by commencing measurement of the travel of the package from the upstream end of section 10 to the appropriate branch outlet, as indicated by the tracking encoder 162.

The purpose of this combination of control elements is to actuate the appropriate solenoid valve 118 at the proper instant when the leading end of the package to be diverted reaches the upstream end of the switch assembly as previously described. For example, the encoder 162 may be a timer synchronized with the speed of the conveyor apron. It may be directly connected with the conveyor drive in such manner as to measure the travel of the particular package from the sensor 161 to the point at which diverting of the pushers beside that package on the apron should begin. Precise timing of the beginning of this action is assured by the proximity switch 90 mounted on the underside of the switch mounting plate 99 in line with one of the holes 165 in the plate which completes the actuating circuit for the solenoid 118 when it senses the presence of the guide pin 33 on the first pusher element to be diverted.

The number of pusher elements to be diverted must of course be sufficient to complete the operation of pushing the related package through the appropriate branch outlet, and this result can be obtained by means coventional in this art. For example, the signal from the sensor 161 may include a measurement of the length of the package which is stored in the memory of the controller 160 for use while the related package is being diverted. Similarly for each package to be diverted, the signal from the scanner 155 will designate the branch line to which that package is to be diverted, and the controller 160 will store that information until it is used with the aid of the tracking encoder 162.

It will be apparent that there is no theoretical limit to the number of side outlets which can be provided in a sortation section according to the invention, and as the number thereof increases, it is necessary only to provide a controller of adequate capacity, particularly from the standpoint of memory, to handle all side outlets.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A package conveyor system including a main line and at least one branch line leading from one side of said main line, comprising
    (a) a frame defining said main line and at least one branch outlet therefrom,
    (b) an endless apron supported for movement on said frame to define a top conveying run and a bottom return run,
    (c) means for driving said apron, (d) a plurality of pusher elements mounted for sliding movement on said apron from one side thereof to the other, (e) each said pusher element having a guide member depending therefrom, (f) primary guide means cooperating with said guide members to retain said pusher elements on the side of said frame opposite said branch outlet (g) a switch member shiftably mounted on said frame upstream from said branch outlet for movement between a retracted position wherein it forms a continuation of said primary guide means and an advanced position wherein it cooperates with successive said guide members to divert successive said pusher elements away from said primary guide means, (h) secondary guide means extending across said frame at an angle to the length thereof opposite said branch outlet for cooperation with said guide members on successive said diverted elements to guide said diverted pusher elements across said apron and thereby to push a package from said apron to said branch outlet, (i) means downstream from said branch outlet for returning said diverted pusher elements to said primary guide means, and (j) supplemental guide means responsive to incomplete movement of said switch member between said retracted and advanced positions thereof for effecting the return of each resulting incompletely diverted guide member to said primary guide means.

2. A package conveyor system as defined in claim 1 wherein said supplemental guide means comprises a knife-edged plate mounted on said frame with said knife edge facing in the opposite direction from the travel of said upper apron run, said plate having side edges diverging from said knife edge to guide diverted said guide members to said primary guide means and to said secondary guide means respectively.

3. A package conveyor system as defined in claim 2 further comprising safety guide means for preventing said guide members from striking said knike edge in substantially centered relation thereto.

4. a package conveyor system as defined in claim 2 wherein said safety guide means comprises a second knife-edged plate mounted for movement out of the way of each of said guide members upon impact with said knife-edge thereof by one of said guide members, and yieldable means normaly biasing said second plate to a position for impact with said knife-edge thereof by an imcompletely diverted said guide member.

5. A package conveyor system as defined in claim 1 wherein said depending guide member on each said pusher element comprises a guide pin proportioned for engagement with said primary guide means and an anti-friction bearing mounted on the upper portion of each said guide pin in position for cooperative guided movement along said secondary guide means while holding said guide pin out of contact therewith.

6. A package conveyor system including a main line and at least one branch line leading from one side of said main line, comprising:

(a) a frame defining said main line and at least one branch outlet therefrom, (b) an endless apron supported for movement on said frame to define a top conveying run and a bottom return run, (c) means for driving said apron, (d) a plurality of pusher elements mounted for sliding movement on said apron from one side thereof to the other, (e) each said pusher element having depending therefrom a guide member comprising a guide pin of relatively small diameter and an anti-friction bearing of substantially greater diameter mounted for rotation on an upper portion of said guide pin spaced above the lower end thereof to leave a lower end portion of said pin exposed below said bearing, (f) primary guide means cooperating with said guide members to guide successive said pusher elements lengthwise of said main line, (g) secondary guide means extending across said frame at an angle to the length thereof opposite said branch outlet, (h) a switch assembly mounted on said frame upstream from said branch outlet and including a guide element having a channel extending lengthwise thereof and proportioned and positioned to receive and guide only said exposed lower end portions of said guide pins on successive said pusher from said primary guide means, (i) selectively operable means for shifting said guide element between a neutral position wherein said channel defines a path in line with said primary guide means and an advanced position wherein said channel cooperates with only said exposed lower end portions of successive said guide pins to divert successive said pusher elements along a path directed toward said secondary guide means, and (j) further guide means positioned for engagement by said bearings on successive said diverted pusher elements from said guide element and to guide said bearings to said secondary guide means.

7. A package conveyor system as defined in claim 6 further comprising a guide member mounted on said frame downstream from said guide element with adjacent side edges thereof converging upstream and defining guiding surfaces directed along said respective paths for engagement by said exposed end portions of successive said guide pins proceeding toward said further guide means respectively.

* * * * *